United States Patent [19]

Byrne et al.

[11] 4,395,430

[45] Jul. 26, 1983

[54] DIKETONE GENERATORS

[75] Inventors: Brian Byrne, Hamburg; Robert S. DeSimone, Oakland, both of N.J.

[73] Assignee: Hercules Incorporated, Wilmington, Del.

[21] Appl. No.: 276,630

[22] Filed: Jun. 24, 1981

[51] Int. Cl.³ .............. C07C 69/76; C07C 67/02; C09F 5/08; A23L 1/226
[52] U.S. Cl. .................. 426/534; 560/105; 560/112; 560/264; 260/410.6
[58] Field of Search .............. 426/534; 560/264, 112, 560/105; 260/410.6

[56] References Cited

U.S. PATENT DOCUMENTS

| | | | |
|---|---|---|---|
| 1,945,345 | 1/1934 | Epstein et al. | 426/534 |
| 1,945,346 | 1/1934 | Epstein et al. | 426/534 |
| 1,945,347 | 1/1934 | Epstein et al. | 426/534 |
| 2,305,621 | 12/1942 | Kremers | 426/534 |
| 2,513,090 | 6/1950 | Finch et al. | 560/112 X |
| 2,860,159 | 11/1958 | Sharp et al. | 260/410.6 X |
| 3,404,176 | 10/1968 | Burton et al. | 560/105 X |
| 3,857,964 | 12/1974 | Yolles | 426/534 X |
| 4,051,164 | 9/1977 | Rung et al. | 260/448.8 R |

FOREIGN PATENT DOCUMENTS 44-7217289 2/1969 Japan ................................. 560/264

OTHER PUBLICATIONS

Furia et al., Fenaroli's Handbook of Flavor Ingredients, 2nd Ed. 1975, CRC Press: Cleveland, Ohio, pp. 78, 123, 231, 245, 390.

Arctander, Perfume and Flavor Chemicals, vol. I, 1969, Publ. by the Author: Montclair, N.J., Items No. 872–873.

*Primary Examiner*—Joseph M. Golian
*Attorney, Agent, or Firm*—William S. Alexander; Jeffrey F. Craft

[57] ABSTRACT

A novel class of alpha-keto geminal diacyloxy compounds is disclosed. These compounds are useful as vicinal diketone generators in foodstuffs. Use for this purpose is also disclosed.

15 Claims, No Drawings

DIKETONE GENERATORS

This invention relates to a novel class of chemical compounds which are useful as generators of vicinal diketones to provide useful flavor effects in a variety of foodstuffs.

Vicinal diketones contribute importantly to the flavor and aroma of such diverse products as baked goods, fruits including citrus and red fruits, brewery products, meat, coffee, cocoa, dairy products, beans, tomatoes, cauliflower and other vegetables, nuts and grain products.

One of the most important of the vicinal diketones is diacetyl(2,3-butanedione) which is found in such diverse food products as butter, apples, citrus fruits, cranberries, currants, grapes, pears, pineapples, raspberries, blackberries, strawberries, cabbage, carrots, celery, potatoes, tomatoes, mint, vinegar, white bread, crisp bread, all types of cheeses, milk, eggs, chicken, turkey, beef, pork, brandy, wine, Arctic bramble, potato chips, popcorn, nut meats, beer, grains, and beans.

The next homolog in the series, 2,3-pentanedione, has also been found in such diverse materials as pork, beer, brandy, cocoa, coffee, nut meats, potato chips, soybeans, white bread, milk, chicken, and beef.

Other vicinal diketones and foods where they have been detected are set forth in the following list:

| | |
|---|---|
| 2,3-hexanedione | coffee, beer |
| 4-methylpentane-2,3-dione | coffee, beer |
| 2,3-heptanedione | beer |
| 3,4-heptanedione | coffee |
| 4,5-octanedione | cocoa |
| 3,4-hexanedione | coffee, cauliflower |
| 5-methylhexane-2,3-dione | coffee, potato chips |
| 5-methylheptane-3,4-dione | coffee |
| 6-methylheptane-3,4-dione | coffee |
| 2,3-octanedione | beef (heated), coffee, soybean |
| 1-(furyl-2)-propane-1,2-dione; | white bread, crisp bread, coffee, |
| 1-(5-methyl furyl-2)-propane-1,2-dione; | roasted onion, coffee, bread |
| 1-(furyl-2)-butane-1,2-dione; | crisp bread, coffee |
| 1-phenylpropane-1,2-dione; | coffee |
| 1-(5-methyl furyl-2)-butane-1,2-dione; | coffee |

When natural foodstuffs to which the vicinal diketones are important contributors are cooked, the flavor and aroma effects of the diketone are continuously generated over the period of cooking. Even though the diketone is volatile, there is a continuous renewal of it throughout the cooking. Duplication of the flavor and aroma profile of natural foodstuffs via flavor compositions making use of the diketones as such is difficult in most cases due to the volatility of the diketone. Unlike a naturally generated flavor, where the diketone is generated and renewed continuously throughout the cooking cycle, the diketone from a flavor composition is volatilized off and lost within the first few minutes of cooking.

Another difficulty in using diketones as such is that they are highly susceptible to air oxidation to the corresponding carboxylic acids. Thus, even in non-processed foods, the flavor effect of the diketone can easily be lost or undesirably altered during storage unless air is scrupulously excluded.

It is the object of this invention to provide a novel method of fixing and protecting vicinal diketones for use in flavor compositions to reduce their volatility and their susceptibility to oxidation while permitting the flavor effect of the diketones to be available under conditions of use in a manner similar to natural foodstuffs.

It is a further object of the invention to provide a novel class of compounds useful as vicinal diketone generators in foodstuffs.

Yet a further object of the invention is to provide a method of modifying a vicinal diketone to a form useful for accomplishing the above objectives.

The objectives of the invention are accomplished by converting the vicinal diketones to alpha-keto diacyloxy derivatives of the general formula

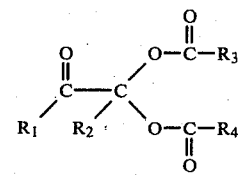

where $R_1$ and $R_2$ are the same or different $C_1$ to $C_5$ hydrocarbon radicals having a total carbon number of 2 to 10, or phenyl radicals, and $R_3$ and $R_4$ are $C_1$ to $C_{18}$ alkyl, cycloalkyl, alkenyl or aryl groups which can be the same or different.

The alpha-keto geminal diacyloxy compounds are prepared by reacting the vicinal diketone with a carboxylic acid anhydride in the presence of an acid catalyst:

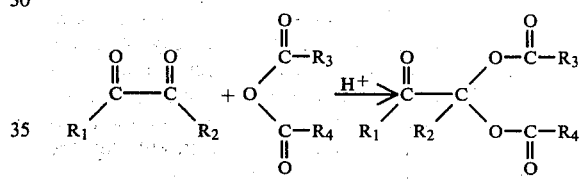

Acid catalysts which are suitable include such proton acids as sulfuric acid, hydrochloric acid, and paratoluenesulfonic acid, Friedel-Crafts catalysts such as zinc chloride, acid-site forming salts such as copper sulfate; or transition metal complexes (Pi acids) such as copper chloride triethylamine complex. Proton acids are the preferred type of acid catalyst.

As a general rule, the acid anhydride employed should be one in which the residues corresponding to $R_3$ and $R_4$ produce acids which are either bland and tasteless so as not to affect the flavor at all or, ideally, produce acids which compliment the flavor to be produced by the diketone. For example, if the compound is to be a generator of diacetyl in a butter flavor, diacetyl dibutyrate can be used to advantage since the hydrolysis produces butyric acid as well as diacetyl. Likewise, in a cheese flavor diacetyl diisovalerate can be used inasmuch as 3-methyl butyric acid, a constituent of cheese and cheese flavors, is produced on hydrolysis.

Alpha-keto geminal diacyloxy compounds corresponding to the above formula are readily decomposed into the diketone and carboxylic acid upon heating in either acid, basic or neutral environment. At lower temperatures they are relatively stable and thus substantially all of the diketone remains available until heating is initiated. Since they are hydrolyzable in an aqueous environment, they can be employed in flavor compositions of substantially any type requiring processing or simply heating for more palatable serving. Moreover, the hydrolysis rate is such that the diketone can be released continuously over the cooking cycle so that its aroma is generated during cooking and the diketone remains to impart its desired flavor impact.

Exemplary, but not all-inclusive, of the alpha-keto geminal diacyloxy compounds encompassed by the formula are:

2-keto-3,3-diacetyloxy butane
2-keto-3,3-dibutanoyloxy butane
4-keto-3,3-diacetyloxy octane
4-keto-3,3-dipropanoyloxy heptane
2-ketone-3,3-distearoyloxy butane
2-keto-3,3-diisopentaneoyl butane
6-keto-7,7-diacetyloxy dodecane
2-keto-3,3-dibutanoyloxy pentane
2-keto-3,3-diacetyloxy heptane
1-keto-2,2-diacetyloxy-1-phenyl propane
1-keto-2,2-dibutanoyloxy-1-phenyl propane
4-keto-3,3-dibenzoyloxy hexane The term "foodstuff" is used herein to include both solid and liquid ingestible materials which usually do, but need not have nutritional value and which require heating prior to serving or packaging. Thus, foodstuffs can include e.g. snack foods, pastries, instant potatoes, pancakes and waffles, dry soups, cooked cheese products, cereals, candy and heated sauces, puddings, and toppings.

The term "flavoring composition" means a combination of flavoring ingredients compounded to impart a flavor to an otherwise bland ingestible material or to enhance or alter a flavor effect already present therein. A "flavor enhancing" composition is one which reinforces or intensifies one or more notes already present in a foodstuff but which may have been inferior initially or which may have been diminished by processing. To "alter" a flavor means to create a flavor in the foodstuff which was not present initially, thus modifying the quality and character of the existing flavor.

A flavoring composition is normally but not necessarily dissolved or suspended in an organoleptically inert carrier such as water or a bland alcohol. In addition, it will also contain one or more co-ingredients or flavor adjuvants including stabilizers, thickeners, surface active agents, conditioners, and other flavorants and flavor intensifiers. Such materials are well known in the flavor and food technology art, and are required to be ingestible and otherwise non-detrimental from an organoleptic standpoint so that the resulting flavor and/or aroma of the foodstuff is not caused to have unacceptable aroma or taste nuances.

Stabilizer compounds include preservatives, e.g., sodium chloride or sucrose; antioxidants, e.g., sodium ascorbate, ascorbic acid, butylated hydroxyanisole, tetrabutyl hydroquinone, propyl gallate, dibutyl hydroxytoluene, ascorbyl palmitate, propyl gallate and the like; and sequestrants, e.g., citric acid or ethylenediaminetetraacetic acid.

Thickener compounds include carriers, binders, protective colloids, suspending agents, and emulsifiers as exemplified by guar gum, carrageenan; cellulose and cellulose derivatives such as carboxymethyl cellulose and methyl cellulose; natural and synthetic gums such as gum arabic, gum tragacanth; gelatin, proteinaceous products and lipids; carbohydrates; starches; pectin; emulsifiers, e.g., mono- and diglycerides of fatty acids; and sugars, e.g. hexoses, pentoses; disaccharides, e.g., sucrose corn syrup and the like.

Surface active agents include emulsifying agents, e.g., fatty acids such as capric acid, caprylic acid, palmitic acid, myristic acid and the like; mono- and diglycerides of fatty acids; lecithin; defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcuma and the like; firming agents such as aluminum sodium sulfate, calcium chloride and calcium gluconate; texturizers, anti-caking agents, e.g., aluminum calcium sulfate and tribasic calcium phosphate, enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

The amount of alpha-keto geminal diacyloxy compound to be added to a foodstuff is simply that amount found to be effective to achieve the desired flavor impact. The precise amount varies considerably depending upon the amount and quality of flavor present in the material to be treated, greater quantities being required as a rule for very bland materials. The amount required will also depend on the ease and rate of hydrolysis of the compound under use conditions. Generally, an effective amount will be between about 1 and 2,000 p.p.m. by weight based on the foodstuff and preferably between about 5 and 1,000 p.p.m.

Flavoring compositions incorporating the alpha-keto diacyloxy compounds of the invention will preferably contain the same in amounts of about 1 up to as much as 50% depending upon the flavor impact sought. This amount is normally not particularly critical per se, the critical parameter being the amount of the flavoring composition employed in a foodstuff. This latter amount must be such as to provide the correct amount as specified above.

In many applications, it is possible to use the alpha-keto diacyloxy compounds by themselves to achieve a flavor enhancement. This is desirable in many instances where the flavor of the foodstuff is inferior, as frequently happens, e.g., when fruits and vegetables are not completely fresh and some of the natural flavor is lost or with varieties in which hybridizing has depleted the expected natural flavor. A small amount of the alpha-keto diacyloxy compound present during processing can add back a substantial portion of the missing or diminished flavor impact.

Most of the alpha-keto diacyloxy compounds are liquids or waxy solids at room temperatures. They can accordingly be used in their natural state when they are to be added to a foodstuff substantially immediately prior to or during processing. However, in those cases where the compounds are to be incorporated into a flavor composition which may be required to sit before being used, it may be desirable to encapsulate the compound or even the entire flavor composition in a nontoxic, substantially flavor indifferent matrix material. Spray drying into a starch or gum matrix is a preferred encapsulation technique. The solid form of the encapsulated flavorant greatly facilitates handling and uniform incorporation into the product. Encapsulation is particularly useful in the case of liquid diacyloxy compounds or liquid flavor compositions. Encapsulating a liquid flavorant is particularly desirable when it is to be incorporated into a dry material, e.g. a beverage powder.

EXAMPLE I
2-KETO-3-ACETYLOXY-3-BUTANOYLOXYBUTANE (MIXED KETAL)

To a 500 ml three-neck round-bottom flask was added 86 g. (1 mol) diacetyl, 76.5 g. (0.75 mole) acetic anhydride and 118.5 g. (0.75 mol) butyric anhydride (0.75 mol). The solution was cooled to 5° C. under a nitrogen atmosphere and concentrated sulfuric acid, 10 g. (0.1 mol), was added. The cooling bath was removed and the mass allowed to warm to room temperature which was maintained for 20 minutes. Sodium bicarbonate, 84 g., was added to the reaction and after 30 minutes of stirring, the product was filtered. The GLC showed the presence of the three possible ketals (diacetate, acetate-butyrate, and dibutyrate) in the ratio 40:37:23, respectively. the isolated acetate-butyrate ketal had the following spectra:

Infrared 1750, 1735 cm$^{-1}$, C=O stretch; 1230, 1125, 1115, 1110, 1020 cm$^{-1}$ C-O stretch.

NMR (ppm downfield from TMS) 0.94 (triplet, J=7 Hz, 3H) CH$_3$—CH$_2$—; 1.66 (quartet, J=7 Hz, 2H) CH$_3$—CH$_2$—; 1.83 (S,3H) CH$_3$—C(O—C=O); 2.10 (S,3H) CH$_3$—CO$_2$—; 2.34 (S,3H) CH$_3$—CO, superimposed on 2.33 (multiplet, 2H) —CH$_2$—CO$_2$—.

EXAMPLE II
2-KETO-3,3-DIACETYLOXYBUTANE

To a 500 ml three-neck round-bottom flask was added 86 g. (1 mol) diacetyl and 122.4 g. (1.2 mol) acetic anhydride. The solution was cooled to 5° C. under a nitrogen atmosphere and concentrated sulfuric acid, 10 g. (0.1 mol), was added. The cooling bath was removed and the mass was allowed to warm to room temperature which was maintained for 20 minutes. A solution containing 68 g. water and 18 g. sodium bicarbonate was added to the reaction. After 10 minutes of stirring the phases were separated and the organic layer was dried over sodium sulfate. The product was distilled through a six inch Vigreux column:

| Cut | Pot Temp. | Head Temp. | Vacuum (torr) | Weight | % Product |
|---|---|---|---|---|---|
| 1 | 69° C. | 53° C. | 16 | 45.2 g | |
| 2 | 63° C. | 45° C. | 12 | 26.3 g | |
| 3 | 80° C. | 50° C. | 12 | 12.5 g | |
| 4 | 81° C. | 79° C. | 6 | 6.3 g | |
| 5 | 81.5° C. | 80.5° C. | 6 | 7.3 g | |
| 6 | 85° C. | 83° C. | 6 | 66.9 g | 99.6 |

Cut 6 represents a 35.6% molar yield of the 2-keto-3,3-diacetyloxybutane.

Infrared 1750 cm$^{-1}$ and 1735 cm$^{-1}$, C=O stretch; 1010, 1115 and 1230 cm$^{-1}$, C-O stretch.

NMR (ppm downfield from TMS) 1.82 (singlet, 3H) CH$_3$—C(O—C=O)$_2$; 2.10 (singlet, 6H) CH$_3$—CO$_2$—; 2.33 (singlet, 3H)CH$_3$—CO$_2$—; 2.33 (singlet, 3H) CH$_3$—C=O.

EXAMPLE III
2-KETO-3,3-DI(3'-METHYLBUTANOYLOXY)BUTANE

To a 250 ml three-neck round-bottom flask was added 21.5 g. (0.25 mol) diacetyl and 55.8 g. (0.3 mol) isovaleric anhydride. The solution was cooled to 5° C. under a nitrogen atmosphere and concentrated sulfuric acid, 3.0 g. (0.03 mol), was added. The cooling bath was removed and the mass was allowed to warm to room temperature which was maintained for two hours. About 25.2 g. of solid sodium bicarbonate and 50 cc hexane were added. The product was vacuum filtered, and the remaining hexane was removed in vacuo. The product was distilled through a six inch Vigreux column:

| Cut | Pot Temp. | Head Temp. | Vacuum (torr) | Weight | % Product |
|---|---|---|---|---|---|
| 1 | 79° C. | 70° C. | 760 | 35.4 g | |
| 2 | 85° C. | 70° C. | " | 14.5 g | |
| 3 | 85° C. | 60° C. | 300 | 10.5 g | |
| 4 | 89° C. | 74° C. | 6 | 13.4 g | 2.3 |
| 5 | 90° C. | 80° C. | 2.5 | 8.9 g | 7.5 |
| 6 | 80° C. | 68° C. | 0.1 | 5.3 g | 37.3 |
| 7 | 98° C. | 87° C. | 0.2 | 11.8 g | 70.4 |
| 8 | 135° C. | 92° C. | 0.2 | 10.9 g | 82.2 |

Obtained 81.6 g. of product. This represents a 24.9% molar yield.

Infrared 1760 cm$^{-1}$ and 1737 cm$^{-1}$ C=O stretch; 1065 and 1120 cm$^{-1}$ C-O stretch.

NMR (ppm downfield from TMS) 0.94 (doublet, J=7 Hz, 12H) CH (CH$_3$)$_2$; 1.83 (singlet, 3H) CH$_3$—C-(O—C=O)$_2$; 1.90-2.3 (multiplet, 6H) —CH$_2$—CH$_2$—(CH$_3$)$_2$; 2.36 (singlet, 3H CH$_3$—C=O.

EXAMPLE IV
3-KETO-2,2-DIACETYLOXYPENTANE

To a 100 ml three-neck round-bottom flask was added 25 g. (0.25 mol) 2,3-pentanedione and 51 g. (0.5 mol) acetic anhydride. The solution was cooled to 5° C. under a nitrogen atmosphere and concentrated sulfuric acid, 2.5 g. (0.025 mol) was added. The cooling bath was removed and the mass was allowed to warm to room temperature which was maintained for 30 minutes. Ten (10) grams of solid sodium carbonate was added. The product was vacuum filtered and distilled through a six inch Vigreux column:

| Cut | Pot Temp. | Head Temp. | Vacuum (torr) | Weight | % Product |
|---|---|---|---|---|---|
| 1 | 70° C. | 55° C. | 4 | 29.4 g | |
| 2 | 84° C. | 83° C. | 4 | 3.5 g | 17.8 |
| 3 | 84° C. | 83° C. | 4 | 3.3 g | 84.3 |
| 4 | 84° C. | 83° C. | 4 | 3.5 g | 87.8 |
| 5 | 85° C. | 82° C. | 4 | 4.8 g | 88.6 |
| 6 | 85° C. | 80° C. | 4 | 7.5 g | 82.4 |

Yield of product was 16.9 grams or 33.5% molar yield. The distillate was a mixture of 67% 3-keto-2,2-diacetyloxypentane and 33% 2-keto-3,3-diacetoyloxypentane.

Infrared 1760 cm$^{-1}$ and 1735 cm$^1$ C=O stretch; 1010, 1110, 1215 and 1235 cm$^{-1}$ C-O stretch.

NMR (ppm downfield from TMS) 0.87 (triplet, J=8 Hz, 0.67×3H), 1.09 (triplet, J=8 Hz, 0.33×3H) CH$_3$—CH$_2$; 2.09 (singlet 0.33×6H), 2.11 (singlet 0.67×6H) CH$_3$—CO$_2$—; 1.81 (singlet 0.67×CH) CH$_3$—C(O-C=O)$_2$; 2.34 (singlet 0.33×3H) CH$_3$-C=O 2.25 (broad multiplet, 2H) CH$_3$—CH$_2$—.

EXAMPLE V

2-KETO-3,3-DIBUTANOYLOXYBUTANE WITH SULFURIC ACID CATALYST

To a one liter three-neck round-bottom flask was added 129 g. (1.5 mol) diacetyl and 306 g. (1.93 mol) butyric anhydride. The solution was cooled to 5° C. under a nitrogen atmosphere and concentrated sulfuric acid, 15 g. (0.15 mol), was added. The cooling bath was removed and the mass was allowed to warm to room temperature which was maintained for two hours. Sodium bicarbonate (52 g.) was added, and the reaction was stirred for ten minutes. The product was vacuum filtered and distilled through a one foot Vigreux column:

| Cut | Pot Temp. | Head Temp. | Vacuum (torr) | Weight | % Product |
|---|---|---|---|---|---|
|  | 73° C. | 53° C. | 2.5 |  |  |
|  | 62° C. | 47° C. | 0.8 |  |  |
| 1 | 64° C. | 49° C. | 0.8 | 66 g |  |
| 2 | 69° C. | 51° C. | 0.1 | 66 g |  |
| 3 | 95° C. | 73° C. | 0.5 | 53.5 g | 5.8 |
| 4 | 99° C. | 92° C. | 1.0 | 8 g |  |
| 5 | 99° C. | 92° C. | 0.5 | 24.7 g | 97.4 |
| 6 | 100° C. | 92° C. | 0.5 | 52.4 g | 98.9 |

Cuts 5 & 6 represent a 21% molar yield of the product.

EXAMPLE VI

2-KETO-3,3-DISTEAROYLOXYBUTANE

To a 500 ml three-neck round-bottom flask was added 55 g. (0.1 mol) stearic anhydride, 8.6 g. (0.1 mol) diacetyl, and 200 cc ether. The mixture was warmed to 36° C. under a nitrogen atmosphere and concentrated sulfuric acid, 3.0 g. (0.03 mol), was added. The solution was then maintained at 33° to 36° C. for two hours at which time a solution containing 5.3 g. sodium bicarbonate in 45.1 g. water was added. After 10 minutes of stirring, the phases were separated. The organic phase was cooled to 0° C. and the solvent was removed under 30 torr vacuum. After the removal of the solvent the product was warmed to room temperature and maintained at 4 torr for four hours, then 0.1 torrs for four hours.

EXAMPLE VII

2-KETO-3,3-DIBUTANOYLOXYBUTANE WITH p-TOLUENESULFONIC ACID CATALYST

To a one liter three-neck round-bottom flask was added 86 g. (1 mol) diacetyl and 316 g. (2 mol) butyric anhydride. The solution was cooled to 5° C. under a nitrogen atmosphere. Anhydrous p-toluene sulfonic acid, 86 g. (0.5 mol), was added. After 30 minutes, the cooling bath was removed after warming to room temperature, the mass was maintained there for 7.5 hours. A solution of 62 g. sodium bicarbonate in 1400 ml water and 200 ml of hexane was added. After 30 minutes of stirring the phases were separated. The organic layer was dried over sodium sulfate. the hexane was removed in vacuo to obtain 195 g. of crude product which was then distilled through an eight inch Vigreux column:

| Cut | Pot Temp. | Head Temp. | Vacuum (torr) | Weight | % Product |
|---|---|---|---|---|---|
| 1 | 70° C. | 60° C. | 0.1 | 22 g | 0 |
| 2 | 72° C. | 52° C. | 0.07 | 47 g | 0 |
| 3 | 85° C. | 45° C. | " | 45 g | 1.5 |
| 4 | 102° C. | 82° C. | " | 14 g | 48.4 |
| 5 | 120° C. | 82° C. | " | 42.5 g | 98.6 |

Cuts 4 & 5 represent a 24% molar yield.

Infrared 1755 cm$^{-1}$ and 1735 cm$^{-1}$, C=O stretch; 1075, 1110, 1125, 1155, and 1180 cm$^{-1}$, C-O stretch.

NMR (ppm downfield from TMS) 0.94 (triplet, J=8 Hz, 6H), CH$_3$—CH$_2$; 1.64 (multiplet, 4H), CH$_3$—CH$_2$=O, superimposed on 2.33 (triplet, J=7 Hz, 4H) CH$_2$-CH$_2$-C=O.

EXAMPLE VIII

HYDROLYSIS OF 2-KETO-3,3-DIACETYLOXYBUTANE

Samples of a 1% aqueous solution of 2-keto-3,3-diacetyloxybutane were either heated at 81°+1° C. in a water bath, or held at 25° C. The progress of the hydrolysis, i.e. the disappearance of the generator compound and the appearance of diacetyl were monitored by gas chromatography (6'×⅛", 15% Carbowax-20M column, 100°–210° C. at 4°/min).

| At 81° C. | | | At 25° C. | | |
|---|---|---|---|---|---|
| Time (min) | % Diacetyl Formed | % Generator Remaining | Time (hrs) | % Diacetyl Formed | % Generator Remaining |
| 12 | 37 | 67.8 | 2 | 22.8 | 73.4 |
| 22 | 57 | 52.5 | 9 | 75.3 | 31.8 |
| 32 | 62.1 | 44.6 |  |  |  |
| 50 | 68.5 | 24.5 |  |  |  |
| 90 | 98.6 | 8.0 |  |  |  |

EXAMPLE IX

HYDROLYSIS OF 2-KETO-3,3-DIBUTANOYLOXYBUTANE

A 2% aqueous ethanol (50%) solution of 2-keto-3,3-dibutanoyloxybutane was heated at 81°+1° C. in a water bath. The disappearance of the generator compound was monitored by gas chromatography (6'×8" 15% Carbowax-20M column, 150°–210° C. at 4°/min).

| Time (min.) | % Hydrolysis of Generator |
|---|---|
| 15 | 2.1 |
| 61 | 8.6 |
| 122 | 17.2 |
| 187 | 22.9 |
| 308 | 38.5 |
| 424 | 49.9 |

EXAMPLE X

DIACETYL GENERATION IN APPLICATION

The above generator compounds are used in various applications where a butter, cheese, or butter-type flavor is desirable. Several applications are detailed below; however, this is not intended to be an all inclusive use list, nor does exclusion of a particular use imply that the subject generator compounds cannot be used in such a manner.

All generators were tested in typical food applications and compared with equivalent amounts of α-dione/carboxylic acid controls. The generators and controls were both compared to blanks containing only the food base. The generator, control and blank samples all underwent the same treatment. The three samples were blind evaluated by a panel of five professional flavorists.

WHITE SAUCE APPLICATION

Generator and control were each added to a milk-shortening mixture which was brought to a boil twice.

| | Generator | Control | Blank |
|---|---|---|---|
| Usage level: | 0.296% (weight) as consumed 2-keto-3,3-distearoyloxybutane | Diacetyl at 0.04% as consumed | |
| Results: | Preferred over the control | Strongest in buttery aroma and taste | Least favored |

BISCUIT APPLICATION

Generator and control were each added to the finished biscuit dough. The biscuits were baked for 10 minutes at about 230° C.

| | Generator | Control | Blank |
|---|---|---|---|
| Usage level: | 0.101% (weight) as consumed of 3-keto-2,2-diacetyloxypentane | 0.110% | 49.5 parts 2.3-pentane dione / 59.4 parts acetic acid |
| Results: | Most impact and the preferred butter flavor | Stronger than control | Least favored |
| Usage level: | 0.110% (weight) as consumed of 2-keto-3,3-diacetyloxybutane | 0.120% | 45.7 parts diacetyl / 63.8 parts acetic acid |
| Results: | Strongest butter flavor by two panelists | Strongest butter flavor by two panelists | Least favored |

CHEESE SAUCE APPLICATION

Generator and control were each added to the warm finished mixture of sauce base. The mixture was heated to 90° C., then retorted for 50 minutes at 117° C. The sauce was allowed to stand three days, then warmed and tested.

| | Generator | Control | Blank |
|---|---|---|---|
| Usage level: | 0.127% (weight) as consumed of 2-keto-3,3-di(3'-methylbutanoyloxy)butane acid | 0.134% | 31.6 parts diacetyl / 74.3 parts isovaleric |
| Results: | Stronger flavor than the blank | Strongest flavor | Least favored |
| Usage level: | 0.114% (weight) as added of 2-keto-3,3-dibutanoyloxybutane | 0.122% | 35.2 parts diacetyl / 72.1 parts butyric acid |
| Results: | Stronger flavor than the blank | Strongest | Least favored |

| | Generator | Control | Blank |
|---|---|---|---|
| | flavor | | |

BUTTER COOKIES APPLICATION

Generator and control were each added to a butter cookie dough which was cooked for 7 minutes at 204° C. on a cookie tin. Evaluation was done by a panel of 12 flavorists.

| | Generator | Control | Blank |
|---|---|---|---|
| Usage Level: | 0.375% by weight as added of 2-keto-3,3-dibutanoyloxybutane | 0.375% | 32.7 parts diacetyl / 67.3 parts butyric acid |
| Results: | Preferred by eight panelists | Preferred by two panelists | Least favored |

What I claim and desire to protect by Letters Patent is:

1. An alpha-keto diacyloxy compound having the structural formula

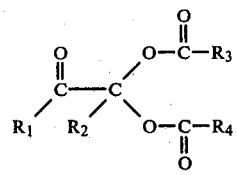

wherein $R_1$ and $R_2$ are methyl radicals or one of them is a methyl radical and the other is an ethyl radical and $R_3$ and $R_4$ are the same or different $C_1$ to $C_{18}$ alkyl radicals.

2. 2-keto-3,3-dibutanoyloxybutane.
3. 2-keto-3,3-diacetyloxybutane.
4. 2-keto-3,3-distearoyloxybutane.
5. 3-keto-2,2-diacetyloxypentane
6. A method of imparting or enhancing the effect of a vicinal diketone in a foodstuff of which said vicinal diketone forms an essential element of the flavor or aroma, which method comprises incorporating into said foodstuff, prior to cooking, about 1 to 2000 ppm by weight of an alpha-keto diacyloxy compound having the structural formula

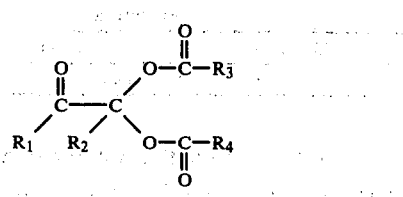

wherein $R_1$ and $R_2$ are methyl radicals or one of them is a methyl radical and the other is an ethyl radical and $R_3$ and $R_4$ are the same or different $C_1$ to $C_{18}$ alkyl radicals, whereby said vicinal diketone is generated substantially continuously during the cooking cycle.

7. The method of claim 6 wherein the diacyloxy compound is 2-keto-3,3-dibutanoyloxybutane.

8. The method of claim 6 wherein the diacyloxy compound is 2-keto-3,3-diacetyloxybutane.

9. The method of claim 6 wherein the diacyloxy compound is 2-keto-3,3-distearoyloxybutane.

10. The method of claim 6 wherein the diacyloxy compound is 3-keto-2,2-diacetyloxypentane.

11. A method of enhancing the effect of a vicinal diketone in baked goods, which method comprises incorporating into said baked goods, prior to baking, about 1 to 2000 ppm of an alpha-keto diacyloxy compound having the structural formula

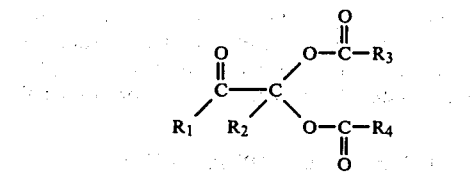

where $R_1$ and $R_2$ are methyl radicals or one of them is a methyl radical and one of them is an ethyl radical and $R_3$ and $R_4$ are the same or different $C_1$ to $C_{18}$ alkyl radicals, whereby said vicinal diketone is generated substantially continuously during the cooking cycle.

12. The method of claim 11 wherein the diacyloxy compound is 2-keto-3,3-dibutanoyloxybutane.

13. The method of claim 11 wherein the diacyloxy compound is 2-keto-3,3-diacetyloxybutane.

14. The method of claim 11 wherein the diacyloxy compound is 2-keto-3,3-distearoyloxybutane.

15. The method of claim 11 wherein the diacyloxy compound is 3-keto-2,2-diacetyloxypentane.

* * * * *